United States Patent [19]

Figge, Sr.

[11] Patent Number: 5,310,080
[45] Date of Patent: May 10, 1994

[54] CONFORMAL FUEL TANK

[75] Inventor: Irving E. Figge, Sr., Manassas, Va.

[73] Assignee: Atlantic Research Corporation, Vienna, Va.

[21] Appl. No.: 31,975

[22] Filed: Mar. 16, 1993

[51] Int. Cl.⁵ ............................................. B65D 88/22
[52] U.S. Cl. .................................. 220/563; 220/562; 220/905; 220/453
[58] Field of Search ................ 138/178, 118; 165/905, 165/46; 220/562, 563, 564, 586, 1.5, 566, DIG. 24, 905, 890, 453, 905; 180/69.4

[56] References Cited

U.S. PATENT DOCUMENTS

| | | | |
|---|---|---|---|
| 639,490 | 12/1899 | Almond | 180/69.4 |
| 2,594,235 | 4/1952 | Taylor . | |
| 2,638,138 | 5/1953 | Proebstle . | |
| 2,736,356 | 2/1956 | Bender et al. . | |
| 3,055,396 | 9/1962 | Koch | 138/118 |
| 3,129,014 | 4/1964 | Hutchison et al. . | |
| 3,380,691 | 4/1968 | McComas . | |
| 3,595,422 | 7/1971 | Durrett et al. . | |
| 3,632,140 | 1/1972 | Paine | 138/178 |
| 3,801,402 | 4/1974 | Suter . | |
| 3,817,290 | 6/1974 | Hilgemann | 138/178 |
| 3,980,202 | 9/1976 | Monyak et al. | 220/318 |
| 4,054,980 | 10/1977 | Roma | 165/905 |
| 4,349,049 | 9/1982 | Silvey | 138/104 |
| 4,671,347 | 6/1987 | MacCracken | 165/905 |
| 4,768,586 | 9/1988 | Berneburg et al. | 165/905 |
| 5,020,687 | 6/1991 | Seizert . | |

Primary Examiner—Allan N. Shoap
Assistant Examiner—S. Castellano
Attorney, Agent, or Firm—Frank P. Presta, Lowe, Price, LeBlanc & Becker

[57] ABSTRACT

Conformal fuel tank which includes an elongate, flexible or rigid, tubular member having a storage chamber therein. The tubular member is bent into a coiled configuration which can conform to a variety of irregular two and three dimensional shapes. Preformed saddle members are provided which include channel members thereon which receive bent portions of the tubular member and maintain them in a bent condition which corresponds to the curved channels. Cap members are provided on the end portions of the tubular members for closing the storage chamber, thereby enabling fuel to be stored therein. The tubular member may include an inner core made of a nylon monomer or copolymer, an intermediate layer around the core made of a fiber-reinforced composite material, and an outer protective layer of polyurethane or the like. The conformal fuel tank is particularly adapted for use in storing fuel such as methane or propane under high pressure in irregular spaces available in a vehicle or the like.

14 Claims, 2 Drawing Sheets

CONFORMAL FUEL TANK

BACKGROUND OF THE INVENTION

The present invention relates to a conformal fuel tank and, more particularly, to a high pressure fuel tank made of flexible or rigid tubing which is curved and coiled to conform to irregular spaces available in vehicles or the like.

Conventionally, high pressure tanks have been constructed with a large cylindrical body and dome-type end caps. Such pressure tank construction precludes conformal shaping and efficient packaging in confined irregular spaces. As a result, high pressure fuel tanks have utilized relatively large amounts of open space in vehicles which could be used for other purposes or even eliminated from the vehicle design. Conventional pressure tanks are also susceptible to dangerous catastrophic failure when subjected to external damage owing to the large energy release rate associated therewith. A vehicle or the like which uses a high pressure fuel tank or tanks often has a significant amount of open and unused irregularly shaped spaces which could be utilized for the storage of fuel.

Therefore, a need has been created for an economical, safe and effective conformal fuel system which can easily be shaped to fit into a variety of available irregular spaces in a vehicle or the like. The conformal fuel tank of the present invention meets this need.

SUMMARY OF THE INVENTION

Accordingly, it is a primary object of the present invention to provide a safe and economical tank which is capable of storing fuel and which can be easily shaped to conform with and fit into available space in a vehicle or the like which uses the fuel.

A more particular object of the present invention is to provide such a conformal fuel tank which is capable of being shaped to conform to a variety of irregular shaped spaces which heretofore have been unusable for the storage of fuel.

Another object of the present invention is to provide a conformal fuel tank which is less susceptible to the hazards associated with catastrophic failure of conventional pressure vessels, by providing a fuel tank which has a significantly reduced energy release rate when subjected to external damage.

Yet another object of the present invention is to provide a conformal fuel tank which will maintain it's conformal shape even when filled with fuel under high pressure.

These and other objects and advantages are obtained by the present invention by providing a conformal fuel tank which includes an elongate, flexible or rigid, tubular member having a storage chamber therein. The tubular member is bent into coiled configuration which conforms to the shape of the space in which it will be located. Preformed saddle members are provided which include channel members thereon to receive bent portions of the tubular member and maintain them in a bent condition which corresponds to the curved channels. Cap members are provided on the end portions of the tubular member for closing and sealing the storage chamber, thereby enabling fuel to be stored therein.

Preferably, the tubular member includes an inner core made of a nylon monomer or copolymer, an intermediate layer around the core made of a fiber-reinforced composite material, and an outer protective layer of polyurethane or the like.

DESCRIPTION OF THE DRAWINGS

Other objects and advantages of the subject invention will become apparent from a study of the following specification when viewed in light of the accompanying drawings, in which.

DETAILED DESCRIPTION

Figure 1:
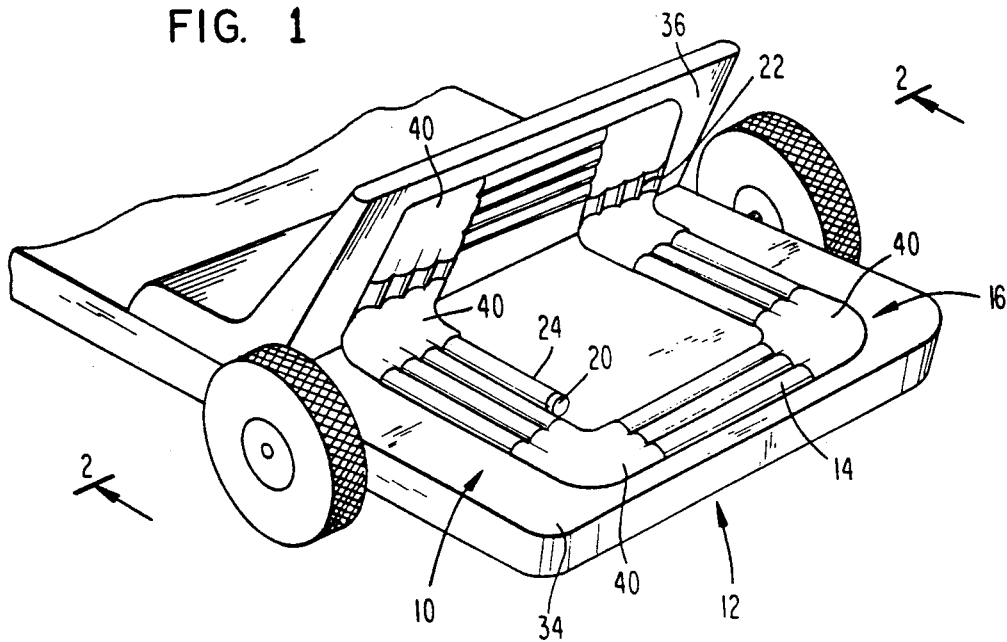
FIG. 1 is a perspective view of the conformal fuel tank of the present invention positioned in and conforming to the trunk area of a vehicle.
Figure 2:
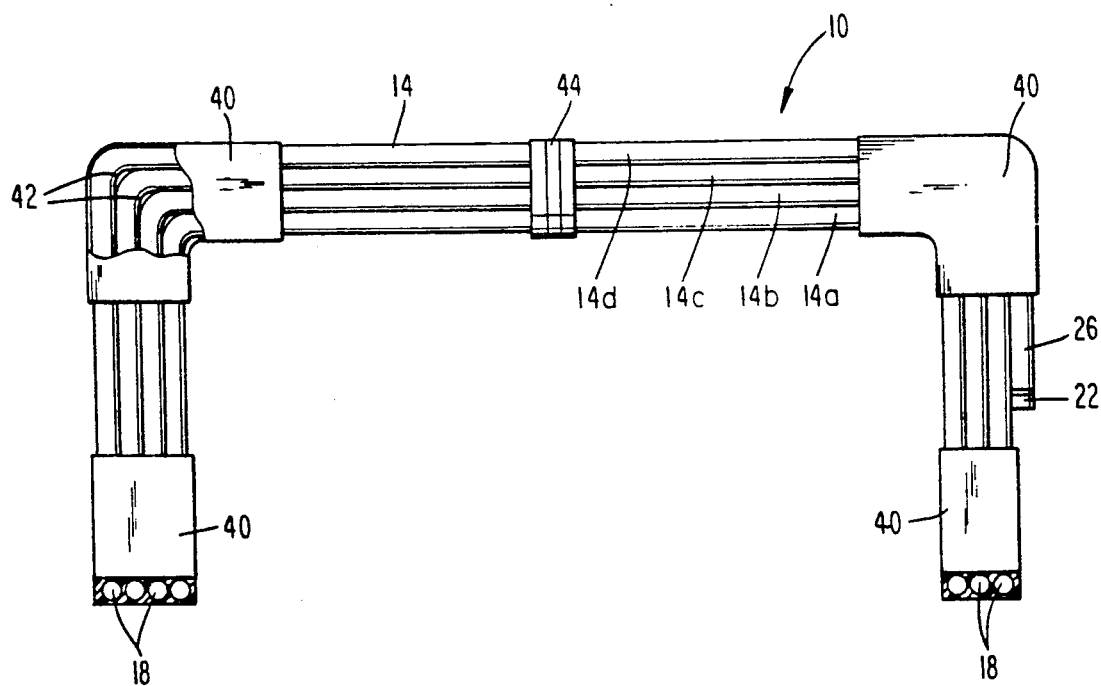
FIG. 2 is an enlarged sectional view of the conformal fuel tank taken along line 2—2 of FIG. 1.

Referring now to the drawings, wherein like reference numerals designate similar parts throughout the various views, there is shown the conformal fuel tank 10 of the present invention. In FIGS. 1 and 2, there is shown a preferred embodiment of the conformal fuel tank 10 which is particularly adapted to fit in a space efficient manner in the trunk area of a vehicle 12. The tank 10 is particularly suitable for use in gaseous fuel systems for vehicles or the like, which use a quantity of gaseous fuel such as methane or propane stored under high pressure. However, the conformal tank 10 may be used to store any other suitable gaseous or liquid substance, such as gasoline or kerosene, and may be employed in any other suitable location other than in a vehicle where such a conformal storage tank would be desirable.

The fuel tank 10 is constructed from an elongate, flexible or rigid, tubular member 14 which is bent or curved at selected locations along it's length to form a coiled configuration 16. The tubular member 14 is hollow to define a storage chamber 18 therein, and includes a pair of end portions 24 and 26 which are sealingly closed by end cap members 20 and 22, thereby enabling the tubular member 14 to store pressurized fuel therein. Preferably the tubular member 14 has a diameter of one-half to six inches, but a tubular member of any other suitable size may be used.

Figure 5:
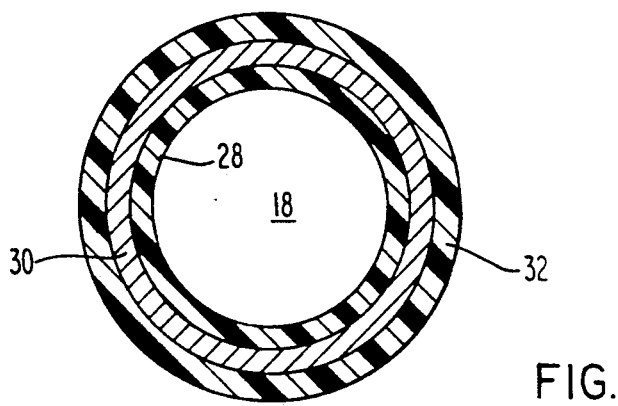
FIG. 5 is a sectional view of a preferred tubular member used to form the conformal fuel tank of the present invention.

As shown in FIG. 5, the tubular member 14 preferably includes in inner core member 28, which may be made of a nylon monomer or copolymer material, or any other suitable material which will not structurally degrade when in contact with the stored fuel therein. A reinforcing layer 30 is provided around the core member 28, and may be made of any suitable fiber-reinforced composite material. An outer protective layer 32, preferably made of polyurethane or the like, is provided around the reinforcing layer 30 to protect the tubular member 14 from external damage. A suitable material which can be used for the tubular member 14 in the present invention is SYNFLEX 3800 high pressure hose available from the Furon Company. However, any other suitable hose material may be used which is strong enough to preclude catastrophic failure and which meets industry standards for high pressure tankage.

Figure 3:
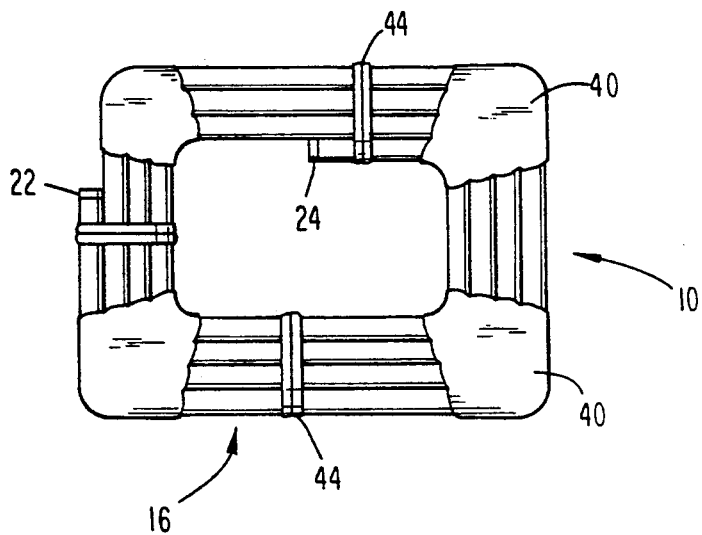
FIG. 3 is an elevational view of an alternative embodiment of the conformal fuel tank of the present invention.
Figure 4:
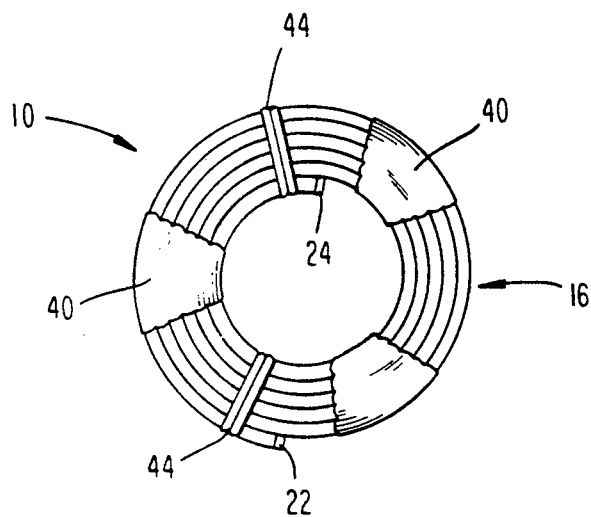
FIG. 4 is an elevational view of another alternative embodiment of the conformal fuel tank of the present invention.

The tubular member 14 can be bent and coiled into a variety of irregular shapes which conform to the space in which it is to be located. The tubular member 14 can be bent into any suitable two or three dimensional coiled configuration 16. FIGS. 1 and 2 show an example of a three dimensional coiled configuration 16 which extends along the trunk floor 34 and the back of the seat 36. FIGS. 3 and 4 show examples of alternative two dimensional coiled configurations 16. While the drawings show the tubular member 14 being coiled concentrically around itself to form the coiled configurations, it may also be coiled in a spiral configuration, a combination of concentric and spiral configuration, or any other suitable coiled configuration which has the desired conformal shape. In the case of a flexible tubular member, the only limitation to the shape and configuration of the tank 10 is the flexibility and bending radius of the tubular member 14 which is used.

In accordance with the invention, the coiled configuration 16 includes coiled portions which include a plurality of tubular member portions 14a, 14b, 14c and 14d, which are positioned in side-by-side relation and extend substantially parallel with one another, as can be seen most clearly in FIG. 2.

In order to maintain the conformal coiled configuration 16, preformed saddle members 40 may be used at the bent portions thereof. Preferably, the preformed saddle members 40 each include a plurality of preformed curved channel members 42 therein which are adapted to receive and retain portions of the tubular member 14 therein, thereby forcing the tubular member portion to conform to the shape of the channel members 42. As shown in FIGS. 1-3, the saddle members 40 may be shaped to cause the tubular member to have a 90 degree bend therein, or they may be shaped to bend the tubular member 14 in any other suitable angle or curvature. For example, FIG. 4 shows saddle members 40 being used to maintain the tubular member 14 in a circular coiled configuration. Preferably, the preformed saddle members 40 are adapted to receive a plurality of parallel side-by-side tubular member portions therein. They may be in the form of split saddles which have top and bottom cooperating portions which lock around the tubular member 14.

Tie members 44 of any suitable type may be used to connect together the side-by-side portions of the tubular member 14 in order to further maintain the it in the desired conformal shape. Preferably, the tie members 44 are strong, lightweight ties, such as nylon ties, which are operable to wrap around adjacent portions of the tubular member.

Any suitable known type of fitting or valve (not shown) may be operatively connected with the tubular member 14 in order to enable fuel to be communicated into and out of the conformal tank 10. Such fittings are well known in the art and are not described further herein.

The conformal fuel tank 10 of the present invention provides an economical and safe fuel tank which can easily be adapted to conform to a variety of irregular spaces, such as the various unused spaces available in a vehicle or the like. The conformal tank 10 significantly reduces the hazards associated with catastrophic failure of conventional pressure vessels due to external damage, because the elongate, coiled storage chamber 18 provided by the present invention has a drastically reduced energy release rate when failure occurs.

While in accordance with the patent statute, the preferred forms and embodiments of the invention have been illustrated and described, it will be apparent to those of ordinary skill in the art that various changes and modifications may be made without deviating from the inventive concepts set forth above.

I claim:

1. Conformal fuel tank, comprising an elongate tubular member having a storage chamber therein, said tubular member being bent into a coiled configuration, means for maintaining said tubular member in said coiled configuration, and means for closing said tubular member storage chamber at end portions thereof, thereby enabling fuel to be stored in said storage chamber, said means for maintaining said coiled configuration including a pre-formed saddle member which is positioned around a bent portion of said coiled configuration, said saddle member including curved channels thereon which receive portions of said tubular member therein, thereby maintaining said tubular member portions in a bent condition which corresponds to said curved channels.

2. Conformal fuel tank as defined in claim 1, wherein said tubular member is flexible.

3. Conformal fuel tank as defined in claim 1, wherein said tubular member is bent to define a two-dimensional coiled configuration.

4. Conformal fuel tank as defined in claim 3, wherein said tubular member is bent to define a three-dimensional coiled configuration.

5. Conformal fuel tank as defined in claim 1, wherein said coiled configuration comprises at least one coiled portion which includes a plurality of tubular member portions which are positioned in side-by-side relation and extend substantially parallel with one another.

6. Conformal fuel tank as defined in claim 5, wherein said at least one coiled portion includes means for connecting said side-by-side tubular member portions together, thereby maintaining said side-by-side relation.

7. Conformal fuel tank is defined in claim 6, wherein said connecting means includes at least one tie member which is wrapped around said at least one coiled portion.

8. Conformal fuel tank as defined in claim 7, wherein said tie member is a flexible nylon tie.

9. Conformal fuel tank as defined in claim 1, wherein said means for closing said tubular member end portions includes cap members which fit over the end portions thereof.

10. Conformal fuel tank as defined in claim 1, wherein said tubular member is one-half to six inches in diameter.

11. Conformal fuel tank as defined in claim 1, wherein said tubular member includes an inner core, an intermediate reinforcing layer around said inner core and an outer protective layer around said reinforcing layer.

12. Conformal fuel tank as defined in claim 11, wherein said inner core is made of a nylon monomer or copolymer.

13. Conformal fuel tank as defined in claim 11, wherein said reinforcing layer is made of a fiber reinforced composite material.

14. Conformal fuel tank as defined in claim 13, wherein said outer layer is made of polyurethane.

* * * * *